April 25, 1944. T. H. MILLER 2,347,359
APPARATUS FOR FABRICATING WOODEN PANELS
Filed May 10, 1943 2 Sheets-Sheet 1

INVENTOR
T.H.MILLER.
By
ATTORNEY

April 25, 1944.  T. H. MILLER  2,347,359
APPARATUS FOR FABRICATING WOODEN PANELS
Filed May 10, 1943   2 Sheets-Sheet 2

INVENTOR
T. H. MILLER
ATTORNEY

Patented Apr. 25, 1944

2,347,359

UNITED STATES PATENT OFFICE 2,347,359

APPARATUS FOR FABRICATING WOODEN PANELS

Theodore H. Miller, Portland, Oreg.

Application May 10, 1943, Serial No. 486,288

5 Claims. (Cl. 143—47)

This invention relates generally to the lumber industry and particularly to a method of and apparatus for fabricating wooden panels.

The main object of this invention is the utilization of short random lengths of end matched lumber such as flooring, ceiling, etc.

The second object is to develop a production line for the fabrication of wooden panels.

The third object is to construct an apparatus for fabricating wooden panels with a minimum amount of labor and at the same time to eliminate cracks caused by curved boards, and also to eliminate the tendency on the part of the panel members to buckle.

The fourth object is to make it possible to construct wooden panels such as a side wall in a prefabricated dwelling with all of the openings properly positioned.

The fifth object is to utilize a large upright drawing board having the cutting lines indicated thereon to enable the operator to choose those pieces of material best adapted to avoid waste and properly break joints, and to place the joints so that the parts may be nailed to their supports to the best advantage.

The sixth object is to eliminate to a large extent the waste in lumber by utilizing the short random lengths thereof to a good advantage.

I accomplish these and other objects in the manner set forth in the following specification as illustrated in the accompanying drawings, in which.

Similar numerals refer to similar parts throughout the several views.

Figure 1:
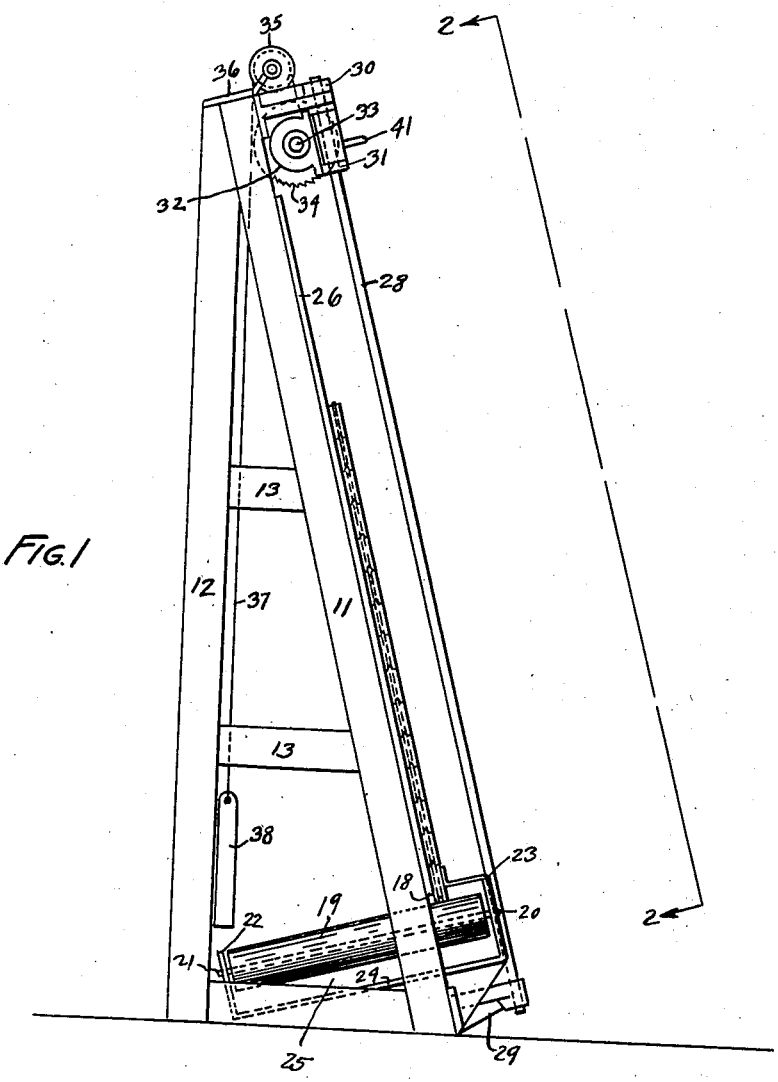
Fig. 1 is an end elevation of the device.
Figure 2:
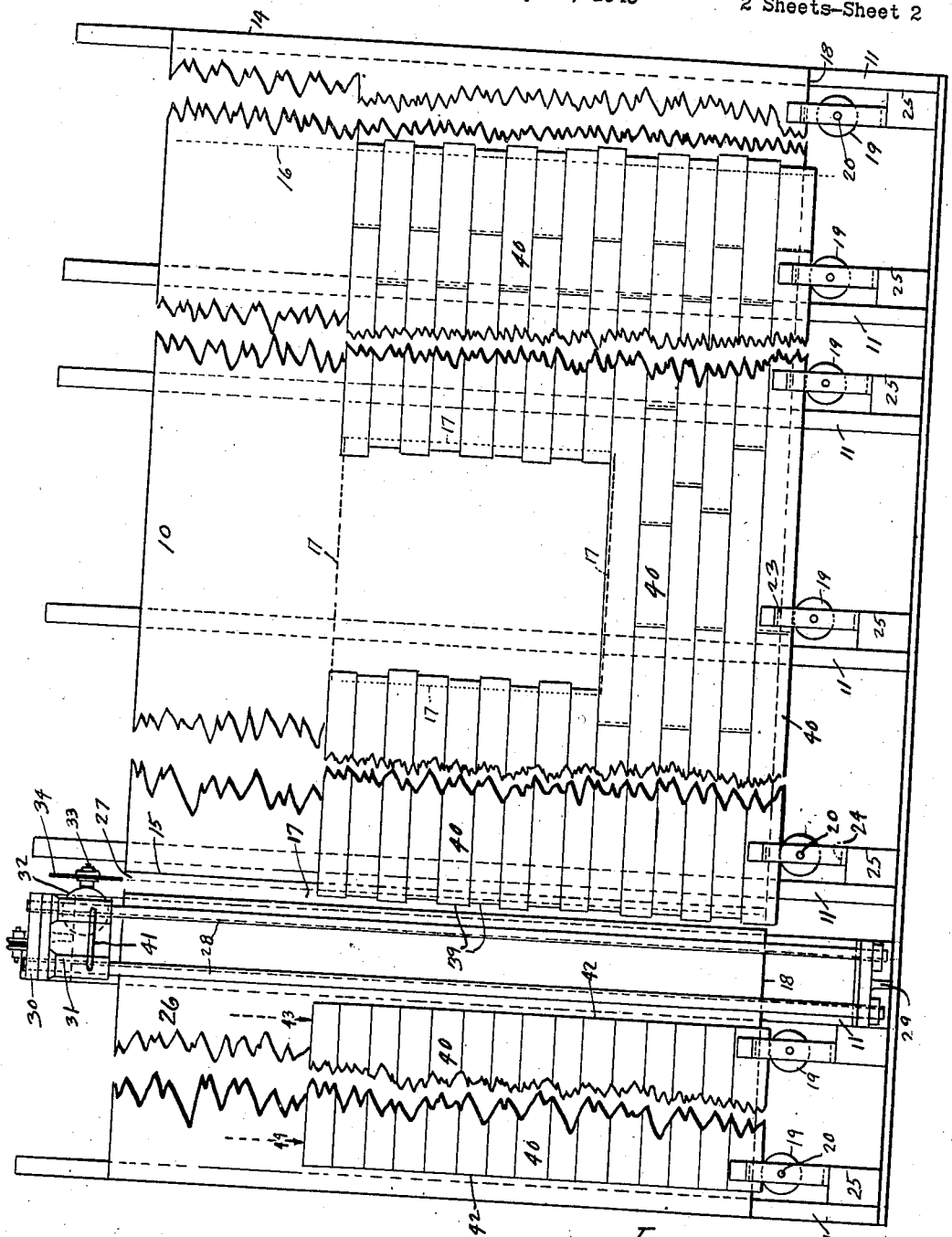
Fig. 2 is a front elevation of the device taken along the line 2—2 in Fig. 1.

Referring in detail to the drawings there is shown a slightly inclined drawing board 10 which is held rigidly by means of the inclined uprights 11 and the vertical uprights 12 which are joined by the cross members 13.

The board 10 extends from the end 14 to the end 15 and has marked thereon the vertical line 16 representing the line where a cut will be made to form the right hand of the panel. The board 10 has also indicated thereon in clearly visible lines 17 the outline of a window opening.

Disposed transversely with the lowermost edge 18 are the rollers 19 whose pivot ends 20 and 21 are supported by the upturned ends 22 and 23 of the bar 24 which is supported by the wedge shaped member 25. The rollers 19 are free to turn under the lowermost edge 18 of the board 10.

The board 10 is divided from the board 26 by the saw slot 27, along the side of which are disposed the guide rods 28 which are held parallel to the slot 27 and to the boards 10 and 26 by the lower bracket 29 and the upper bracket 30 which are disposed at opposite ends of the adjacent upright 11.

Slidably mounted on the guide rods 28 is a cross head 31 on which is secured the motor 32 on whose shaft 33 is mounted the cut-off saw 34. A pulley 35 is mounted on the bracket 36 at the upper end of the frame 11 adjacent the slot 27.

A cable 37 is attached to the cross head 31 and passes over the pulley 35 down to the counter weight 38 which is slightly heavier than the cross head 31 and its attached motor 32 and saw 34, and serves to urge it to an uppermost position.

The operation of the apparatus is as follows:

Assuming that panels of predetermined dimensions are to be reproduced in duplicate from end matched material, it is only necessary for the operator to place pieces of end matched material, the edges of which are also matched as in flooring and ceiling, on the rollers 19 against the board 10 and thereafter place tier upon tier of the pieces extending between the indicated line 16 and the slot 27 omitting, if desired, the space shown within the dotted lines 17 which is shown only by way of example as a window opening.

It will be noted that the joints between the adjacent tiers are broken and that the ends 39 are not even although they extend across the lines 16 and 17 or into the slot 27.

It will also be noted that inasmuch as the pieces are of short length, that they are set closely to the next piece below, thereby eliminating any of the buckling tendencies which would be noticeable if full length lumber was to be used.

When the boards 40 have been placed to the desired height to complete the panel, the saw 34 is moved downwardly by a pull on the handle 41 which is integral with the cross head 31, causing those ends which project into the slot 27 to be cut off and form a straight line 42.

The vertical lines 16 and 17 may then be cut by sliding the panel until the lines are under the saw 34. The lines 16 and 17 may either be offset from the board 10 to the panel by marking, or the trimmed edge 42 brought into contact with the marks 43 and 44 or special stops (not shown) may be provided for such purposes.

It can be seen from the foregoing that great speed can be obtained in assembling panels from small pieces of end matched lumber without the need of specially skilled labor, due to the fact that the boards are held in place by gravity and all springiness has been removed from the boards by reason of their short lengths and the positioning of the cuts which are simplified to the extreme.

In addition thereto, where special nailing is required, the position of the studs in the finished house can be indicated on the board 10 so that the operator can break his joints to the best possible advantage. Also, where doors and other panels are to be made for use in which they would be nonsupported near the ends, the ends of such doors could be made up of longer pieces, the operator being constantly aware of the need for a particular length of piece best adapted for a given place.

It will be understood that while I refer to panels for use in making walls in prefabricated houses, and for doors and the like, that the use of the apparatus and method is not to be confined to these particular tasks but will be found useful in the mass production of panels of any kind made from end matched lumber.

Since the further disposition of the cut panels forms no part of the present invention, it will be sufficient here to state that the cut panels are properly clamped together prior to the final assembling.

I claim:

1. A production line for fabricating panels of end matched lumber consisting of an upright drawing board having the outlines of the panel indicated thereon, rollers under the lower edge of said board for supporting short pieces of lumber thereon and a cut off saw moveable in a vertical plane normal to the surface of said board.

2. An apparatus of the class described, an inclined drawing board having supporting rollers along the lower edge thereof, a guide mounted along the front of said board, a saw mounted on said guide adapted to move in a vertical plane intersecting said board and means for indicating on said board the outlines of a panel to be formed thereon.

3. An apparatus as described in claim 2 characterized by having a counter balance for said saw adapted to urge same to an uppermost position above the upper edge of a panel to be formed thereon.

4. In an apparatus of the class described consisting of an inclined drawing board having rollers mounted along the lower edge thereof, a cut-off saw adapted to move across the surface of said drawing board in a vertical plane and marks on said drawing board for indicating the positions at which cuts shall be made on boards as they move along the surface of said drawing board upon said rollers.

5. An apparatus of the class described consisting of a plurality of upright members having one sloping side, a drawing board and an assembling board mounted against said sloping side and spaced from each other to form a saw slot, a pair of guide rods disposed along the front of said boards in front of said slots, a saw slidably mounted on said guide rods adapted to operate within said saw slot, and a plurality of rollers under the lower edge of said board, the axes of which are perpendicular to the board.

THEODORE H. MILLER.